United States Patent
Neal et al.

(10) Patent No.: US 7,246,805 B2
(45) Date of Patent: Jul. 24, 2007

(54) APPARATUS AND METHOD FOR CONVERTIBLE CARGO CARRIER

(76) Inventors: Phillip H. Neal, 171 Terrace Ave., San Rafael, CA (US) 94901; Jon Oxford, 143 16th St., #2, Brooklyn, NY (US) 11215; Wade Spital, 728 H St., Petaluma, CA (US) 94952

( * ) Notice: Subject to any disclaimer, the term of this patent is extended or adjusted under 35 U.S.C. 154(b) by 176 days.

(21) Appl. No.: 10/905,083

(22) Filed: Dec. 14, 2004

(65) Prior Publication Data

US 2005/0156002 A1 Jul. 21, 2005

Related U.S. Application Data

(60) Provisional application No. 60/608,172, filed on Sep. 8, 2004, provisional application No. 60/531,232, filed on Dec. 19, 2003.

(51) Int. Cl.
*B60R 6/00* (2006.01)
(52) U.S. Cl. .......................... 280/35; 280/37; 280/47.28
(58) Field of Classification Search ................ 280/638, 280/35, 639, 37, 79.2, 47.131, 47.16, 47.17, 280/47.18, 47.2, 47.24, 47.26, 47.27, 47.28, 280/47.29, 47.41; 190/100, 115; 206/335; 224/485
See application file for complete search history.

(56) References Cited

U.S. PATENT DOCUMENTS

| | | | | |
|---|---|---|---|---|
| 3,861,695 A | * | 1/1975 | Shourek et al. | ............ 280/5.24 |
| 3,865,392 A | * | 2/1975 | Hartway | ....................... 280/35 |
| 3,960,252 A | * | 6/1976 | Cassimally | ................ 190/18 A |
| 4,340,132 A | | 7/1982 | Cerna | |
| 4,538,709 A | | 9/1985 | Williams et al. | |
| 4,792,025 A | | 12/1988 | Thomas | |
| 5,295,565 A | | 3/1994 | Latshaw | |
| 5,323,886 A | | 6/1994 | Chen | |
| 5,348,325 A | * | 9/1994 | Abrams | ....................... 280/40 |
| 5,374,073 A | | 12/1994 | Hung-Hsin | |
| 5,377,795 A | | 1/1995 | Berman | |
| 5,421,605 A | | 6/1995 | Chen | |
| 5,507,508 A | * | 4/1996 | Liang | .......................... 280/37 |
| 5,524,920 A | * | 6/1996 | Tsai | ............................ 280/652 |
| 5,769,194 A | * | 6/1998 | Chang | ...................... 190/18 A |
| 5,816,604 A | * | 10/1998 | Hsieh et al. | ............. 280/655.1 |
| 5,863,055 A | | 1/1999 | Kasravi et al. | |
| 5,941,352 A | * | 8/1999 | Lee | .............................. 190/11 |
| 6,016,893 A | * | 1/2000 | Chen et al. | .................... 190/1 |

(Continued)

*Primary Examiner*—Christopher P. Ellis
*Assistant Examiner*—Brian Swenson
(74) *Attorney, Agent, or Firm*—Patent Law Offices - MEW; Michael E. Woods

(57) ABSTRACT

A convertible cargo carrier for offering a traveler the advantages of both pulling and pushing systems for use in conveying objects during their travels. The apparatus includes a cargo platform having a base, and a back coupled to the base; a motive structure coupled to the base for moveably supporting the cargo platform above a surface; a handle, coupled to the back, and a rack member, moveably and extendably coupled to the base, including one or more rack motive elements, the rack member including a first mode for engaging the surface with the one or more rack motive elements and a second mode with the one or more rack motive elements disengaged from the surface, the rack member presenting a platform adjacent the cargo platform when in the first mode.

42 Claims, 7 Drawing Sheets

U.S. PATENT DOCUMENTS

| | | | |
|---|---|---|---|
| 6,102,433 A * | 8/2000 | Stevens | 280/646 |
| 6,149,168 A * | 11/2000 | Pauser et al. | 280/47.371 |
| 6,193,033 B1 | 2/2001 | Sadow et al. | |
| 6,237,734 B1 * | 5/2001 | Chen | 190/18 A |
| 6,302,414 B1 * | 10/2001 | Berthiaume et al. | 280/47.18 |
| D456,973 S | 5/2002 | Kimpel | |
| 6,425,599 B1 * | 7/2002 | Tsai | 280/652 |
| 6,488,304 B2 * | 12/2002 | Krawczyk | 280/408 |
| 6,832,670 B2 * | 12/2004 | Wolters et al. | 190/18 A |
| 6,938,905 B1 * | 9/2005 | Tsai | 280/47.29 |

* cited by examiner

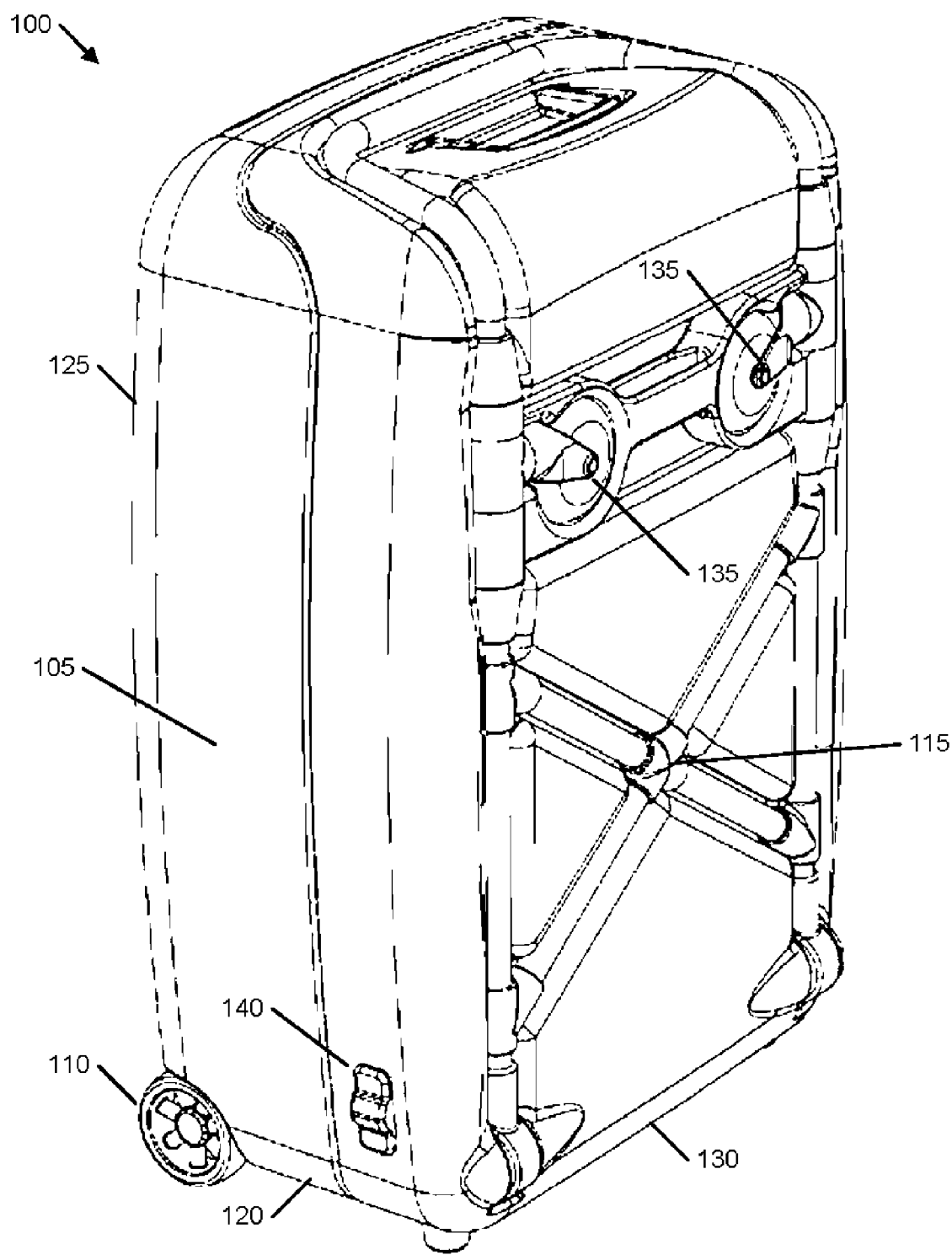
Figure_1

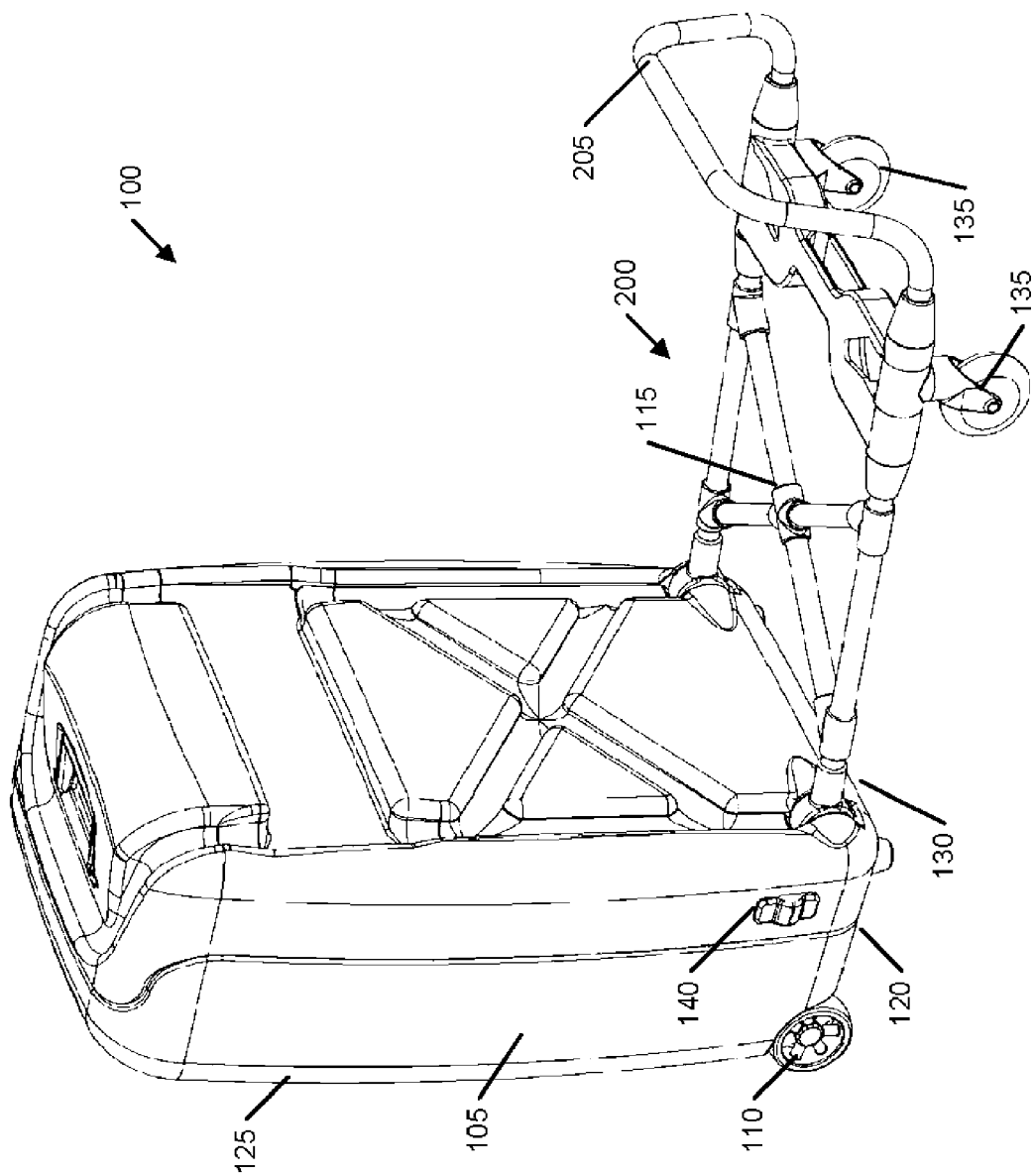
Figure_2

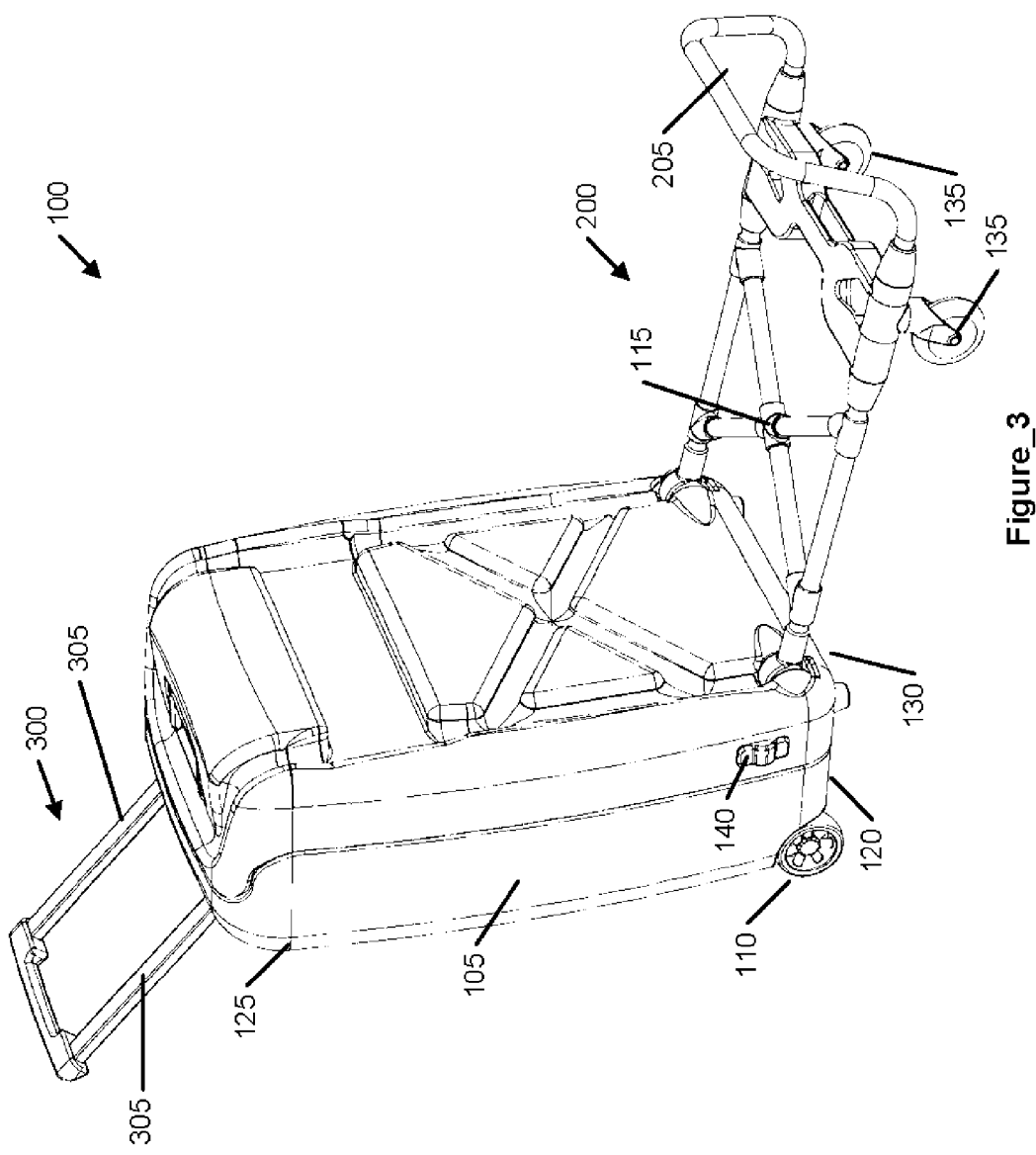

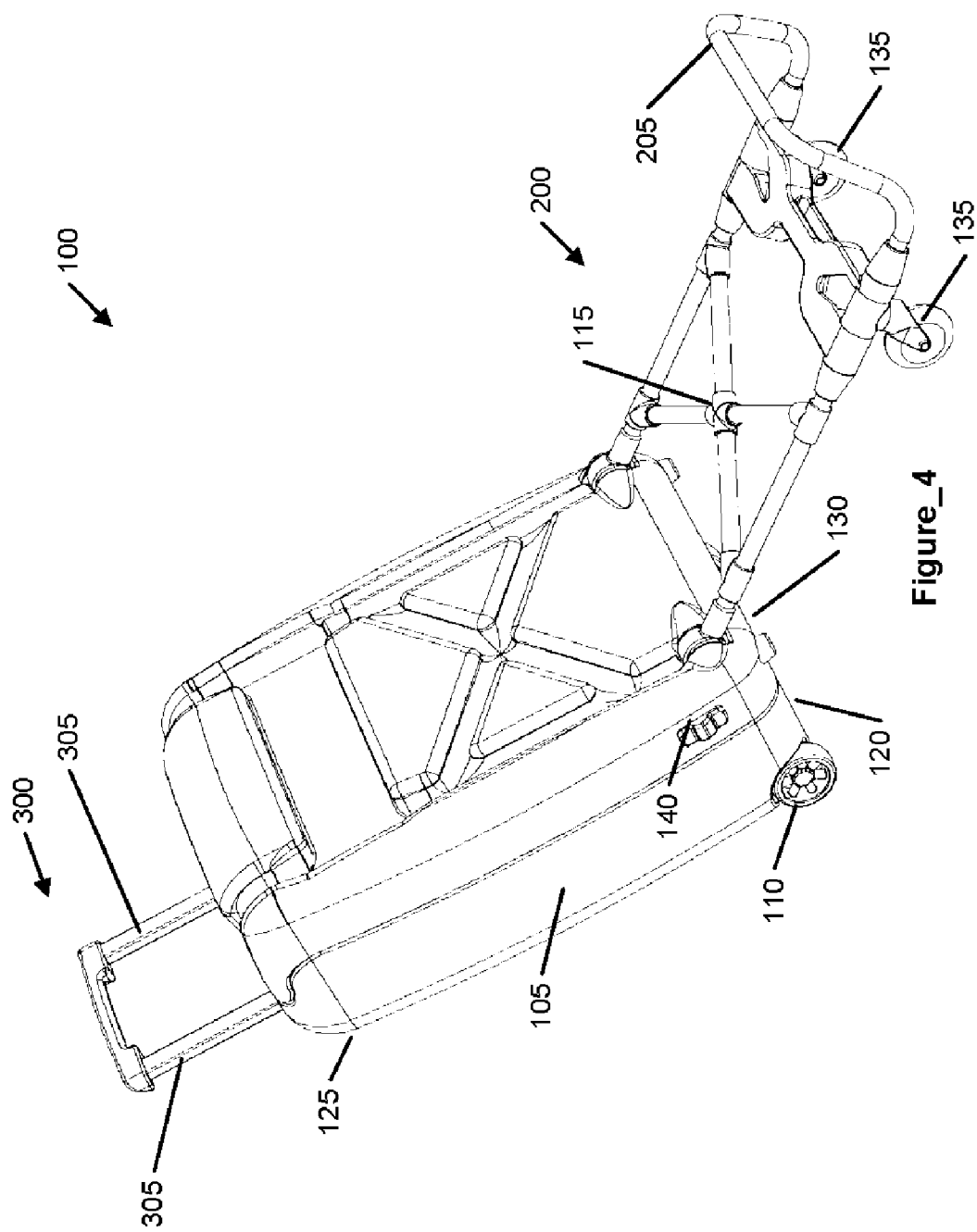
Figure_4

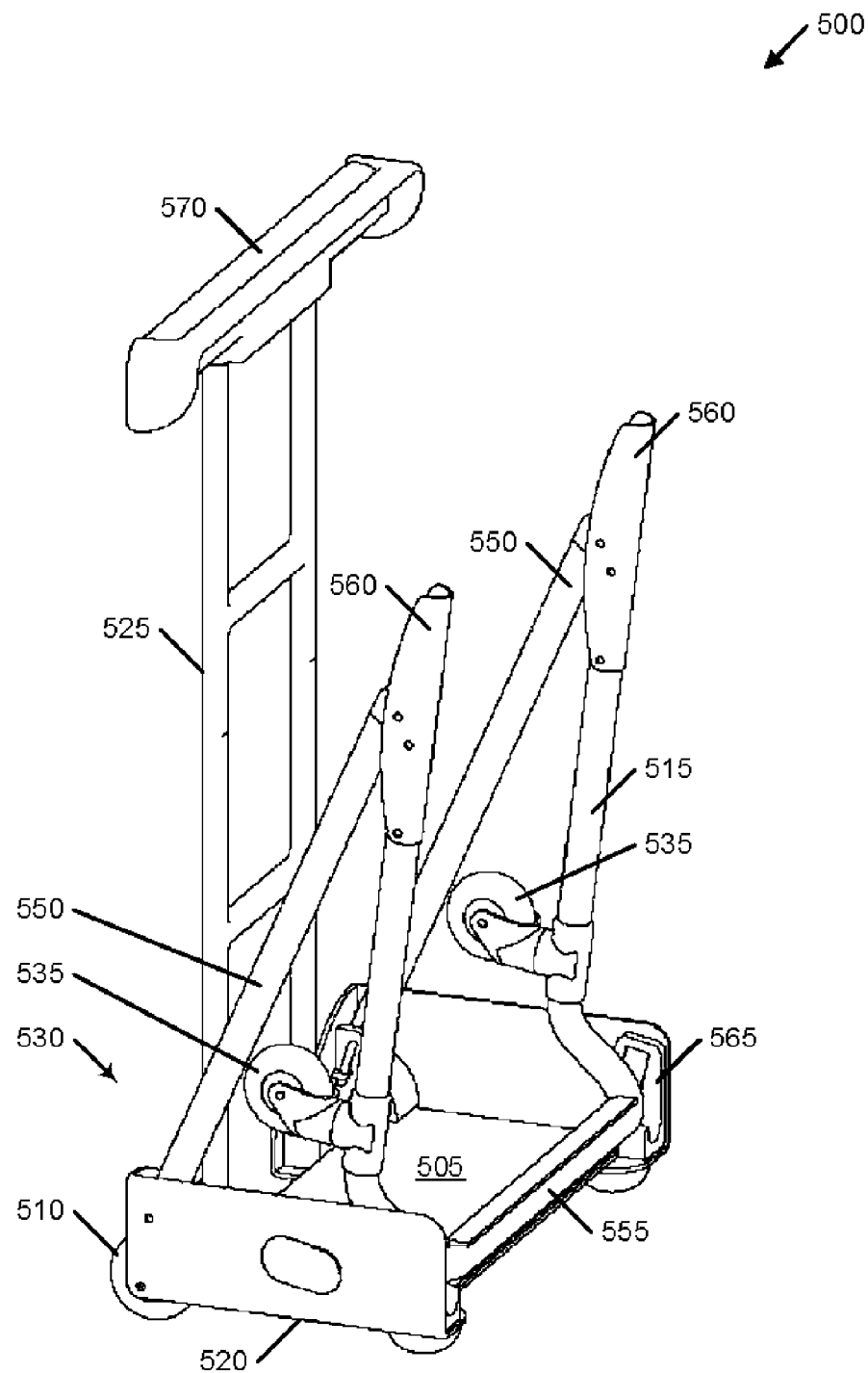
Figure_5

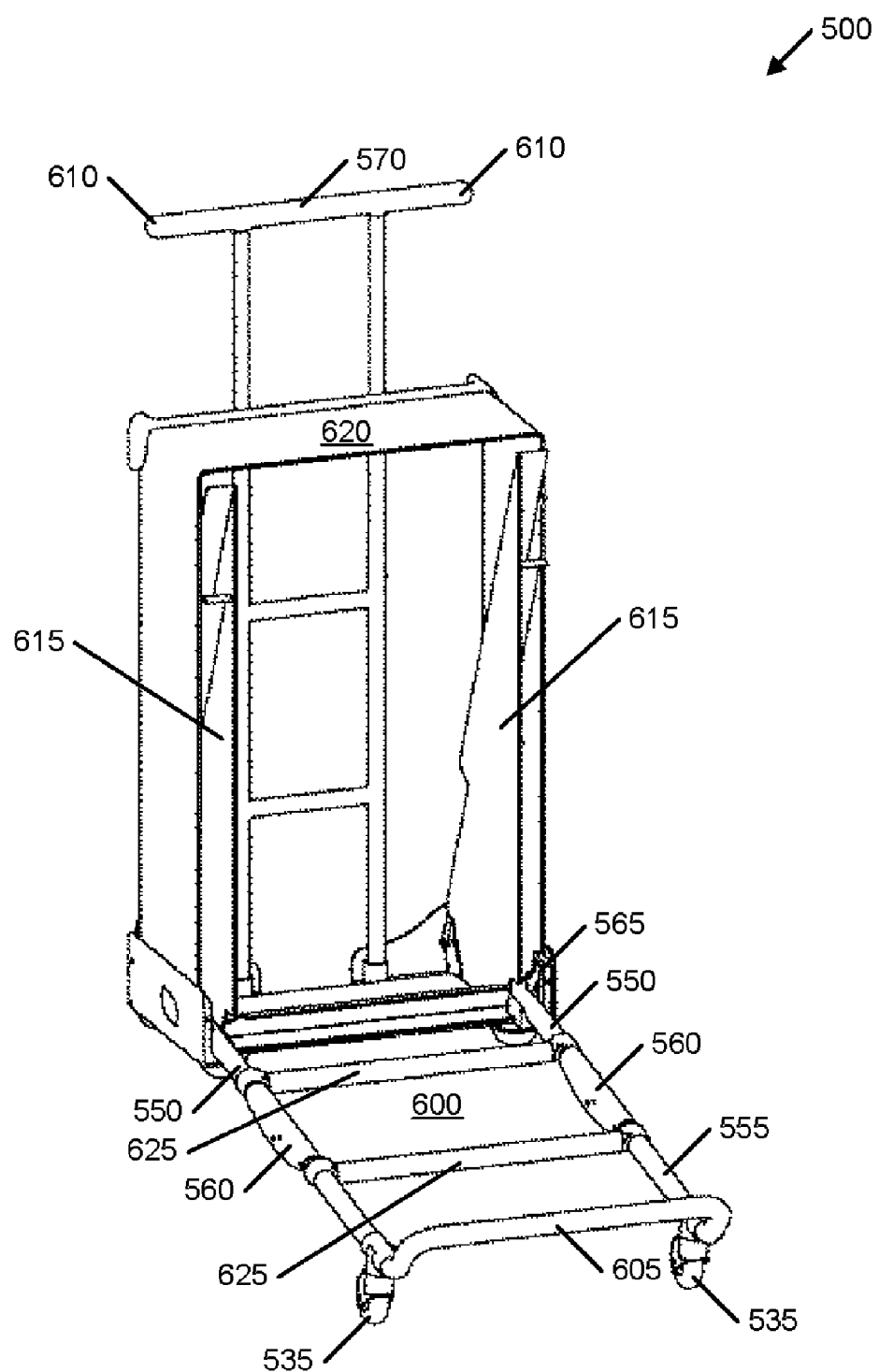
Figure_6

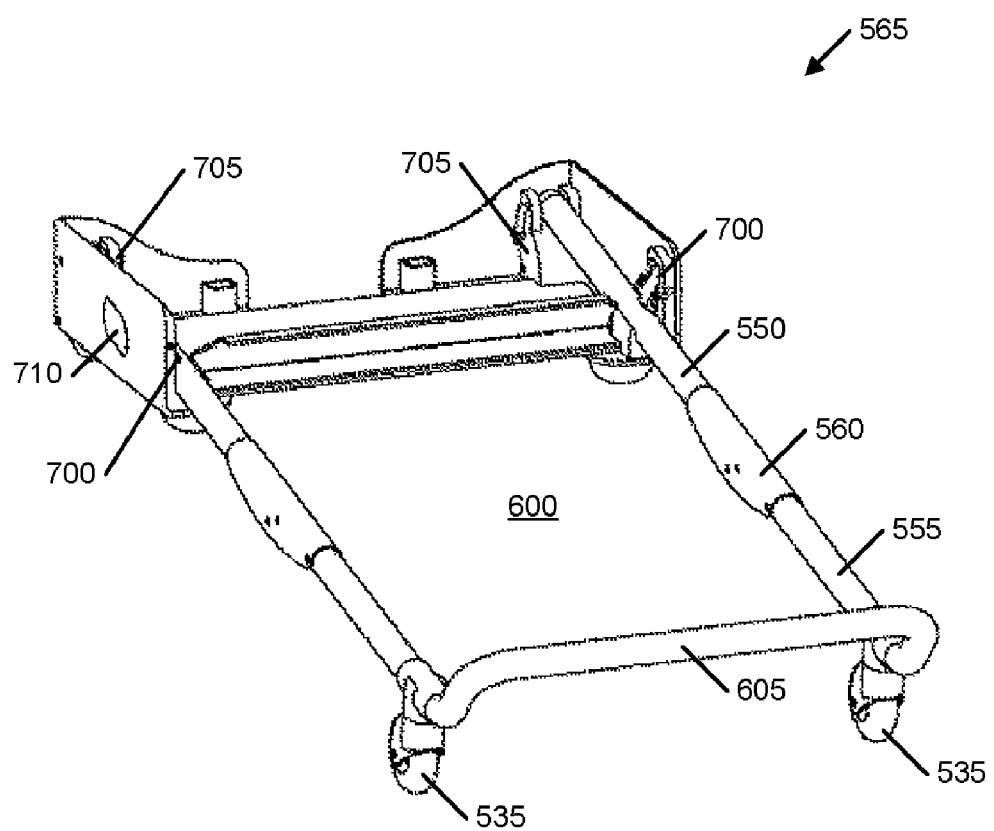
Figure_7

APPARATUS AND METHOD FOR CONVERTIBLE CARGO CARRIER

CROSS-REFERENCE TO RELATED APPLICATIONS

The present application is related to, and claims the benefit of, both U.S. Provisional Patent application 60/531,232 entitled "Apparatus and Method for Convertible Cargo Carrier" filed 19 Dec. 2003 and U.S. Provisional Patent application 60/608,172 entitled "Apparatus and Method for Convertible Cargo Carrier" filed 8 Sep. 2004, the contents and entireties of which are expressly incorporated in their entireties by reference herein.

BACKGROUND OF THE INVENTION

The present invention relates generally to cargo conveyance systems and methods, and more particularly to manual personal cargo carriers used by individuals to move things from one location to another.

When one or more people travel from one location to another, either by foot, car, boat, plane or otherwise, it is often desirable or necessary to move one or more objects between these locations. For many different reasons, it is often inconvenient to carry these objects, whether due to the weight of the objects, the number of the objects, or just the bulk of the objects.

The prior art has developed travel aids for assisting travelers, including wheeled luggage and towable luggage dollies. Wheeled luggage include a number (typically two or four) wheels integrated into a base of each piece of luggage to permit the luggage item to be towed behind the traveler.

The luggage dolly permits the traveler to move objects that do not have integrated wheels because the traveler stacks the objects on a platform and tows the dolly (with the stacked objects) between the locations. These dollies are designed to be convenient by including folding cargo platforms and telescoping bodies to take up reduced space when not in use.

Some manufacturers integrated these luggage dollies directly into selected pieces of luggage, with a towing arm that telescopes out of a back to permit easy towing with a pair of wheels integrated into a base. This development is convenient in that a separate luggage dolly need not be accounted for between towing activities. Some inconvenience was increased for those travelers that used the dolly for conveying multiple objects. There are some specialty luggage items that may be towed in different configurations. For example, a large parallelepiped type of suitcase includes a pair of wheels integrated into one corner for upright pulling while it includes four wheels integrated into one face for converting into a flat cart that may be towed with other objects stacked on top, like a pull-cart.

These prior art systems and methods have limited effectiveness when a person or group of people travels with more objects than the number of people available for towing. Such is the case when a family travels with young children for example. The number of objects that need to be moved exceed the towing capacity of the available towers, again either because of number/weight/size of the collection of objects.

In some travel depots, like airports and train and bus depots, a push-cart is provided for limited use by travelers. These push carts are particularly advantageous in moving large numbers of objects, moving heavy objects, and/or moving bulky objects. Pushing is preferred in some implementations because heavier loads are more easily maneuvered when located out in front of the operator than from pulling the load behind the operator.

In crowded environments or when there is limited space for the operator to move, it is sometimes desirable to pull a cart, however, this pulling method is usually easier when the cargo load is not too large or heavy to fit on the cart. However, unlike a typical two-wheel Pullman-style cargo container, there is some advantage to providing three or more wheels on the floor and a flexible pivot point that lets the operator hold the handle at a comfortable position while maneuvering. This multi-wheel method also allows for a larger cargo payload on the cart than a two wheel Pullman approach. With regards to the advantages of pushing a cart versus pulling, there is the leverage provided and mechanical advantage of having both hands located on the out part of a wide handlebar when maneuvering a cart full of cargo. Having two hands on the handlebar is more practically achieved in a forward moving cart configuration than in a pull mode. It is also easier for the operator to maneuver a cart full of cargo forward when the cart with four wheels on the floor is largely perpendicular to the steering bar and is held rigidly in place to provide maximum leverage when steering and pushing the cart forward (versus the pull technique which provides some pivot movement in the relationship between the cart and the handlebar for user comfort when pulling).

It is desirable to provide an apparatus and method offering a traveler the advantages of both pulling and pushing systems for use in conveying objects during their travels.

SUMMARY OF THE INVENTION

The present invention includes apparatus and method for a convertible cargo carrier for offering a traveler the advantages of both pulling and pushing systems for use in conveying objects during their travels. The apparatus includes a cargo platform having a base, and a back coupled to the base; a motive structure coupled to the base for moveably supporting the cargo platform above a surface; a handle, coupled to the back, and a rack member, moveably coupled to the base, including one or more rack motive elements, the rack member including a first mode for engaging the surface with the one or more rack motive elements and a second mode with the one or more rack motive elements disengaged from the surface, the rack member presenting a platform adjacent the cargo platform when in the first mode. The method of operating a cargo carrier includes moving a rack member from a first mode to a second mode, wherein the rack member, moveably coupled to a base of a cargo platform having a base, and a back coupled to the base, a motive structure coupled to the base for moveably supporting the cargo platform above a surface, and a handle coupled to the back; the rack member includes one or more rack motive elements, the rack member including the first mode for engaging the surface with the one or more rack motive elements and a second mode with the one or more rack motive elements disengaged from the surface, the rack member presenting a platform adjacent the cargo platform when in the first mode.

This convertible cargo carrier provides the operator with a single system for pushing or pulling objects that they are traveling with, whichever is the most advantageous or desirable. These and other novel aspects of the present invention will be apparent to those of ordinary skill in the art upon review of the drawings and the remaining portions of the specification.

BRIEF DESCRIPTION OF THE DRAWINGS

FIG. 1 is a perspective view of a preferred embodiment of the present invention for a standing convertible cargo carrier;

FIG. 2 is a perspective view of a preferred embodiment of the present invention for the convertible cargo carrier shown in FIG. 1 ready for loading;

FIG. 3 is a perspective view of a preferred embodiment of the present invention for the convertible cargo carrier shown in FIG. 1 in a pushcart configuration;

FIG. 4 is a perspective view of a preferred embodiment of the present invention for the convertible cargo carrier shown in FIG. 1 in a pullcart configuration;

FIG. 5 is a perspective view of an alternate preferred embodiment for a standing convertible cargo carrier in a "closed" mode;

FIG. 6 is a perspective view of a loading mode for the cargo carrier shown in FIG. 5; and FIG. 7 is a perspective close-up view of an attachment and latching system for the cargo carrier shown in FIG. 5 and FIG. 6.

DESCRIPTION OF THE SPECIFIC EMBODIMENTS

The present invention relates to providing an apparatus and method offering a traveler the advantages of both pulling and pushing systems for use in conveying objects during their travels. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

FIG. 1 is a perspective view of a preferred embodiment of the present invention for a standing convertible cargo carrier 100. Carrier 100 includes a cargo platform 105, a motive system 110, and a rack member 115 coupled to platform 105. Platform 105 in the preferred embodiment is integrated into a container, such as an article of luggage (e.g., a suitcase), an ice chest, an industrial wheeled cargo container, and the like. The container may include one or more rigid sidewalls, semi-rigid sidewalls, or flexible (e.g., fabric) sidewalls, for one or more portions of platform 105. In some implementations, there are no sidewalls with platform 105 having a base 120 and a back 125 coupled to base 120, similar to an appliance dolly or furniture truck. Platform 105 may also be adapted for use in cooperation with passenger vehicles, such as for example a baby stroller, or jogging stroller.

Motive system 110 permits platform 105 to be moved over a surface, and is adapted for the type or types of surfaces over which platform 105 will be moved. When the surface is a smooth, hard, planar surface, such as a floor in an airport terminal, motive system 110 may only use a pair of small, thin, hard plastic wheels. When a rougher surface is considered, motive system 110 may include larger diameter, wider wheels that may be made of a softer material. In some implementations, such as for use at a beach or outdoor location, motive system 110 may use even larger, wider, and softer wheels. Motive system 110 may, in some embodiments, be implemented as caster wheels, or a single roller, or other conveyance system. In some embodiments, one or more additional motive elements may be coupled to an underside of base 120, which in some implementations may improve stability and load bearing, particularly when rack member 115 is in the pushcart and/or pullcart modes described below.

Rack member 115 of the preferred embodiment is hingedly coupled to base 120. Rack member 115 pivots from a coupling near an edge 130 of base 120 that is on an opposite side from back 125. Rack member 115 in this embodiment rotates about the coupling into the pushcart mode and/or the pullcart mode. Rack member 115 includes one or more rack motive elements 135 that engage the surface over which carrier 100 moves.

In the preferred embodiment, there are two rack motive elements 135 (e.g., pivoting "castor-type" wheels though other motive supports may be used) that support rack member 115 in the pushcart and the pullcart modes. Rack motive elements 135 each also dock when rack member 115 is in a closed mode, and they are deployed when rack member 115 is in the pushcart mode and the pullcart mode. In the preferred embodiment, the docking and deployment of rack motive elements 135 are fully automatically responsive to movement of rack member 115 between the various modes of operation. That is, in the closed mode, rack motive elements 135 rotate and move into a storage recess and in the pushcart mode and the pullcart mode, rack motive elements 135 extend and lock into a surface engaging and load bearing position.

The preferred embodiment uses a tensioned cable attached to a cable assembly inside a tube of rack element 115. A pair of helical grooves in the walls of the tube provides a camming surface to operate a cable assembly attached to both the cable and to rack motive elements 135. As the cable assembly is moved in the grooves by the cable, responsive to movement of rack member 115, rack motive elements 135 move between the stored and the deployed positions.

In some embodiments, rack motive elements 135 may be operated using a different fully-automatic system. In other embodiments, rack motive elements may be operated in a semi-automatic mode (e.g., elements 135 deploy automatically when member 115 is moved into the pushcart mode or the pullcart mode, but are manually stored when member 115 is moved into the closed mode) or a fully-manual mode.

A latch 140 is also shown in FIG. 1 that works in cooperation with rack member 115. Latch 140 is preferably used to lock rack member 115 in an open position, for example for use in the pushcart mode.

FIG. 2 is a perspective view of convertible cargo carrier 100 shown in FIG. 1 ready for loading. In this loading mode, rack member 115 is rotated down and away from back 125 to present a cargo platform 200. Platform 200 is generally planar and includes a rail 205 at a front edge of rack member 115 as an aid to organizing and moving objects placed on top. For the loading mode, cart member 115 forms an angle of about ninety degrees with back 125. In other embodiments and implementations, this angle may be more or less, and may be locked or restrained by latch 140.

FIG. 3 is a perspective view of a preferred embodiment of convertible cargo carrier 100 shown in FIG. 1 in a pushcart configuration. In the pushcart configuration, a handle 300 is telescoped out from back 125. For the pushcart mode, cart member 115 forms an angle greater than about ninety degrees with back 125. In other embodiments and implementations, this angle may be more or less, and may be locked or restrained by latch 140 into a particular angle or limited range of angles.

Handle 300 includes a pair of spaced-apart handholds 305 to permit an operator to push and steer carrier 100. Carrier 100, when loaded and configured for pushing, may in some instances require a greater torque for turning than is typically possible to achieve with a single handed handle commonly used in pullcarts and the like. Depending upon particular configuration, implementation, and loading, a minimum optimum separation distance for handholds 305 may be established. Currently, a minimum separation distance is about eight inches. In some implementations, handholds 305 may be provided as extendible (e.g., pivoting or sliding) elements from a center telescoping handle 300. Handle 300 shown in FIG. 3 is advantageously "U-shaped" because it may function as for two-handed push operation, and one-handed pull operation when carrier 100 is in the pullcart configuration shown in FIG. 4. In some implementations, handle 300 may be non-telescoping and integrated into cargo platform 105. For example, handholds 305 may be provided on lateral top edges of back 125.

FIG. 4 is a perspective view of a preferred embodiment of the present invention for the convertible cargo carrier shown in FIG. 1 in a pullcart configuration. For the pullcart mode, cart member 115 forms an angle of greater than ninety degrees with back 125 (and preferably greater than the angle for the pushcart mode. In other embodiments and implementations, this angle may be more or less, and may be locked or restrained by latch 140 into a particular angle or limited range of angles. However, in the pullcart mode, it is anticipated that the angle will vary during pulling (e.g., be free pivoting) as the operator advances different distances in front of carrier 100.

Carrier 100 offers a user an ability to efficiently push a load (e.g., a sizeable, bulky, numerous, or weighty load) while also providing for efficiently secondary pulling of extended loads. Latching mechanism 140 may be located at different locations, such as for example near a handle 130 for easy release, near the hinged coupling between rack member 115 and base 120 (as shown) for foot operation, or in some cases on rack member 115.

Access to the interior of cargo platform 105 may be provided through rack member 115 when platform 105 is a container and rack member 115 is closed. For example, rack member may be integrated into a discreet half of cargo platform 105 to allow access to interior of a typical cargo carrier without benefit of said cart member. Another approach may allow access by means of a secondary cargo access door, through the rack member 115, when rack member 115 is retracted.

In some embodiments, it is desirable to provide a detachment system between cargo platform 105 and rack member 115. This would be an implementation permitting a user to remove rack member 115 when it is not to be used to help reduce weight (e.g., applicable to an adventure type traveler).

A preferred embodiment for carrier 100 includes two molded rigid "L-shaped" structures in the cargo platform and the rack element. Rack element 115 located at a front pivot point of the base of cargo platform 105 and deployable is combined with soft, semi rigid or hard case cargo component. This reduces torque when maneuvering a fully burdened payload. In some embodiments, implementations include a fifth support wheel for a duffle bag container version (flexible/soft sidewalls), to enhance structural integrity for the duffle bag as the foundation.

An additional feature of rack element 115 when used in cooperation with a flexible or soft-walled cargo platform 105 is that rack element 115 may include a protective exoskeleton when folded/retracted that surrounds cargo platform 105. In this mode, rack element 115 is made somewhat larger relative to cargo platform 105 than depicted to provide a barrier between the walls of the cargo platform and objects external to carrier 100. The substantiality of the barrier will be dependent upon many factors, including the number, composition, and configuration of components of rack element 115 when in closed, protective mode.

FIG. 5 is a perspective view of an alternate preferred embodiment for a standing convertible cargo carrier 500 in a "closed" or "folded" configuration. Carrier 500 includes a cargo platform 505, a motive system 510, and a rack member 515 coupled to platform 505. Carrier 500 is similar to carrier 100 and differs predominately by the structure and method of attachment of rack member 515 to base 505. For ease in understanding the alternate preferred embodiment, significant structural members and their interrelationships are shown free from incorporation into the various implementations. Like platform 105 shown in FIG. 1, platform 505 in the preferred alternate embodiment may be integrated into a container, such as an article of luggage (e.g., a suitcase), an ice chest, an industrial wheeled cargo container, and the like. The container may include one or more rigid sidewalls, semi-rigid sidewalls, or flexible (e.g., fabric) sidewalls, for one or more portions of platform 505. In some implementations (similar to that shown), there are no sidewalls with platform 505 having a base 520 and a back 525 coupled to base 520, similar to an appliance dolly or furniture truck. Platform 505 may also be adapted for use in cooperation with passenger vehicles, such as for example a baby stroller, or a jogging stroller.

Motive system 510 permits platform 505 to be moved over a surface, and is adapted for the type or types of surfaces over which platform 505 will be moved. When the surface is a smooth, hard, planar surface, such as a floor in an airport terminal, motive system 510 may include a pair of small, thin, hard plastic wheels. When a rougher surface is considered, motive system 510 may include larger diameter, wider wheels that may be made of a softer material. In some implementations, such as for use at a beach or outdoor location, motive system 510 may use even larger, wider, and softer wheels. Motive system 510 may, in some embodiments, be implemented as caster wheels, or a single roller, or other conveyance system. In some embodiments, one or more additional motive elements may be coupled to an underside of base 520, which in some implementations may improve stability and load bearing, particularly when rack member 515 is in the pushcart and/or pullcart modes described below.

Rack member 515 of the preferred embodiment is hingedly coupled to base 520. Rack member 515 pivots from a coupling near an edge 530 of base 520 that is preferably on an adjacent side as back 525. Rack member 515 includes one or more rack motive elements 535 that engage the surface over which carrier 500 moves. Rack member 515 is a folding member including a pair of lateral arms 550 hingedly coupled to a front rack support 555 and to base 520. A pair of support sleeves 560, one at each pivot attachment of arm 550 to support 555, is disposed to strengthen the coupling of the arms to the support. Rack member 515 in this embodiment rotates and unfolds about the couplings into the pushcart mode and/or the pullcart mode.

In the preferred embodiment, there are two rack motive elements 535 (e.g., pivoting "castor-type" wheels though other motive supports may be used) that support rack member 515 in the pushcart and the pullcart modes. Rack motive elements 535 of the alternate preferred embodiment do not have a docking mode, though when implemented as castor wheels and the like they may be adapted to automatically rotate into a neutral position for insertion into sheath when folded as discussed below. Some implementations may however provide for a docking/undocking mechanism for elements 535.

A latching system 565 is also shown in FIG. 5, and in more detail in FIG. 7, that works in cooperation with rack member 515. Latching system 565 is preferably used to lock rack member 515 in an open position, for example for use in the pushcart mode. A retractable handle 570 (shown retracted) is telescoped into back 525 in the preferred embodiment. Handle 570 of the preferred embodiment extends vertically from back 525 for a pushcart mode or a pullcart mode of carrier 500.

FIG. 6 is a perspective view of a pushcart mode for the cargo carrier shown in FIG. 5. In this pushcart mode, rack member 515 is rotated down and away from back 525 and unfolded to present a cargo platform 600. Platform 600 is generally planar and includes a rail 605 at a front edge of front support member 555 as an aid to organizing and moving objects placed on top of platform 600. For a loading mode, cart member 515 forms an angle of about ninety degrees with back 525. In other embodiments and implementations, this angle may be more or less, and may be locked or restrained by latching system 565.

Handle 570 is telescoped out from back 525 for the motive modes. For the pushcart mode, cart member 515 preferably forms an angle greater than about ninety degrees with back 525. In other embodiments and implementations, this angle may be more or less, and may be locked or restrained by latching 565 into a particular angle or limited range of angles. In some implementations, the loading mode and the pushcart mode may be essentially the same, in some cases varying by extending/retracting handle 570.

Handle 570 includes a pair of spaced-apart handholds 610 to permit an operator to more easily push and steer carrier 500. Carrier 500, when loaded and configured for pushing, may in some instances require a greater torque for turning than is typically possible to achieve with a single handed handle commonly used in pullcarts and the like. Depending upon particular configuration, implementation, and loading, a minimum optimum separation distance for handholds 610 may be established. Currently, a minimum separation distance is about eight inches. In some implementations, handholds 610 may be provided as extendible (e.g., pivoting or sliding) elements from a center telescoping handle 570. Handle 570 shown in FIG. 6 is advantageously "U-shaped" because it may function as for two-handed push operation, and one-handed pull operation when carrier 500 is in the pullcart configuration shown in FIG. 4. In some implementations, handle 570 may be non-telescoping and integrated into cargo platform 505. For example, handholds 610 may be provided on lateral top edges of back 525. Also shown in FIG. 6 are a pair of lateral protective sheaths 615 that form a docking cavity to receive rack member 515 when folded and stowed. Sheaths 615 cooperate with a container 620, e.g., luggage, to isolate rack member 515 from contents of container 620 while permitting easy and efficient stowage and unfolding to transform between the various operational modes of carrier 500. Also shown in FIG. 6 are optional rack support members 625 that may be removeable, affixed, or repositionable to provide flexibility in defining a configuration platform 600 best suited for supporting objects during use of carrier 500 and in some cases providing ballast for rack member 515. For example, supports 625 may slide forward and aft, such that in the stowed mode they are proximate ends of rack member 515 while for loading they are repositioned nearer sleeves 560. Alternatively, they may be positioned near front edge 605 when stowed and moved into a desired location when unfolded. Supports 625 may be stowable in the cavities formed by sleeves 615 and rotated across platform 600 to engage an opposite side. Other configurations are possible in various implementations.

FIG. 7 is a perspective close-up view of attachment and latching system 565 for cargo carrier 500 shown in FIG. 5 and FIG. 6. System 565 includes a pair of lateral latches 700 that capture and hold arms 550 when rotated and unfolded. Each arms 550 of the preferred embodiment pivots about a mount 705, with a relative height of mount 705 compared to latch 700 helping to define an operational angle of back 525 relative to rack member 515. Latch 700 is preferably a snap latch permitting latching engagement when arm 550 is pivoted down into position. A release 710 disengages latches 700 to permit arms 550 to rotate and rack 515 to fold. Attaching and pivoting arms 550 using mounts 705 located near the rear edge as shown increases a strength and rigidity of a deployed rack member, particularly when pushing, turning, and otherwise maneuvering carrier 500 in a pushcart configuration.

The alternate preferred embodiment permits rack member 515 to be stored and protected from external elements/weather and, with sheaths 615, protecting contents of container 620 from contaminants on rack member 515. In some configurations, carrier 500 provides a longer rack member 515 when deployed because the folding characteristic increases the unfolded length thereby increasing the stowage capacity. Providing container 620 with a double zipper permits both a rack member access and a contents access depending upon which section is used. In the alternate preferred embodiment, it is simple to provide access to container contents in any of the operational modes of carrier 500. As disclosed in the discussion of carrier 100 above, rack member 515 is removeable (e.g., at hinge 705) to reduce an overall unloaded weight of carrier 500.

Various components and subsystems of carrier 100 and carrier 500 have been described as rotating, folding, pivoting, and the like. While these are descriptive of the preferred embodiments, these terms are not to be understood as limiting the nature of the couplings and/or the components or subsystems. The present invention contemplates, sliding, moving, shifting, and other types of structures and relationships to achieve the described structures and methods. In some implementations, rack element 115 and rack element 515 may be detachable for transition between the multiple modes. That is, rack element 115/rack element 515 may be stored in cooperation with platform 105/platform 505, detached and subsequently reattached for the pushcart mode and/or the pullcart mode. Further, in some embodiments, rack element 115/element 515 may just be a secondary subsystem only attached for the pushcart/pullcart modes and stored separate from carrier 100/carrier 500 for other modes.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Thus, the scope of the invention is to be determined solely by the appended claims.

What is claimed is:

1. An apparatus, comprising:
   a cargo platform having a base, and a back coupled to said base;
   a motive structure coupled to said base for moveably supporting said cargo platform above a surface;
   a handle coupled to said back; and
   a rack member, moveably and extendably coupled to said base, including one or more rack motive elements, said rack member including a first mode for engaging said surface with said one or more rack motive elements and a second mode with said one or more rack motive elements disengaged from said surface, said rack member presenting a platform adjacent said cargo platform when in said first mode.

2. The apparatus of claim 1 wherein said cargo platform is integrated into a container.

3. The apparatus of claim 2 wherein said container is detachable from said rack remember.

4. The apparatus of claim 3 wherein said container is detachable using quick release couplings.

5. The apparatus of claim 2 wherein said container is a suitcase.

6. The apparatus of claim 2 wherein said container is an ice chest.

7. The apparatus of claim 2 wherein said container is an industrial wheeled cargo container.

8. The apparatus of claim 2 wherein said container is a combination baby/cargo stroller.

9. The apparatus of claim 2 wherein said container includes a plurality of flexible sidewalls.

10. The apparatus of claim 9 wherein said flexible sidewalls include fabric components.

11. The apparatus of claim 9 wherein said rack member juxtaposes a rigid member external to one or more portions of one more flexible sidewalls of said plurality of flexible sidewalls when in said second mode.

12. The apparatus of claim 2 wherein said container includes a plurality of rigid sidewalls.

13. The apparatus of claim 12 wherein said rack member is integrated into a portion of one of said rigid sidewalls.

14. The apparatus of claim 1 wherein said back is coupled to said base along an edge and wherein said motive structure includes a first wheel and a second wheel laterally displaced from each other along an axis parallel to said edge.

15. The apparatus of claim 1 wherein said handle telescopes relative to said back.

16. The apparatus of claim 1 wherein said handle includes a pair of handholds laterally displaced from a centerline of said back.

17. The apparatus of claim 16 wherein said pair of handholds are displaced a minimum of about eight inches from each other.

18. The apparatus of claim 16 wherein said pair of handholds are coupled to a handhold structure coupled to said back.

19. The apparatus of claim 18 wherein said handhold structure telescopes relative to said back.

20. The apparatus of claim 19 wherein said pair of handholds extend from said handhold structure.

21. The apparatus of claim 20 wherein said pair of handholds are pivotally coupled to said handhold structure.

22. The apparatus of claim 21 wherein said pair of handholds are slidably coupled to said handhold structure.

23. The apparatus of claim 1 wherein said rack member is rotatably coupled to said base with said rack member rotating between said first mode and said second mode.

24. The apparatus of claim 23 wherein said first mode extends said rack member in a first angle of about ninety degrees or greater from said back.

25. The apparatus of claim 24 including a latching mechanism coupled to said rack member for maintaining said first angle substantially fixed.

26. The apparatus of claim 25 wherein said first mode is a push mode and said second mode is a non-cargo mode.

27. The apparatus of claim 23 wherein said one or more rack motive elements are wheels.

28. The apparatus of claim 23 wherein said one or more rack motive elements include a first position relative to said rack member when said rack member is in said first mode and a second position relative to said rack member when said rack member is in said second mode, said second position adapted for storage of said one or more rack motive elements.

29. The apparatus of claim 28 wherein said one or more rack motive elements move between said first position and said second position responsive to rotation of said rack member between said modes.

30. The apparatus of claim 1 wherein said one or more rack motive elements are wheels.

31. The apparatus of claim 1 wherein said one or more rack motive elements include a first position relative to said rack member when said rack member is in said first mode and a second position relative to said rack member when said rack member is in said second mode, said second position adapted for storage of said one or more rack motive elements.

32. The apparatus of claim 1 wherein said rack member extends by unfolding.

33. The apparatus of claim 32 wherein said rack member includes a first arm and a second arm, each arm hingedly coupled to both said base and to a front support member.

34. A method of operating a cargo carrier, the method comprising:
moving and unfoldingly extending a rack member from a first mode to a second mode, wherein said rack member, moveably coupled to a base of a cargo platform having a base, and a back coupled to said base, a motive structure coupled to said base for moveably supporting said cargo platform above a surface, and a handle coupled to said back; said rack member includes one or more rack motive elements, said rack member including said first mode for engaging said surface with said one or more rack motive elements and a second mode with said one or more rack motive elements disengaged from said surface, said rack member presenting a platform adjacent said cargo platform when in said first mode.

35. An apparatus, comprising:
a cargo platform having a base, and a back coupled to said base;
a motive structure coupled to said base for moveably supporting said cargo platform above a surface;
a handle coupled to said back; and
a rack member, moveably coupled to said base, including one or more rack motive elements, said rack member including a first mode for engaging said surface with said one or more rack motive elements and a second mode with said one or more rack motive elements disengaged from said surface, said rack member presenting a platform adjacent said cargo platform when in said first mode.

36. A method of operating a cargo carrier, the method comprising:
moving a rack member from a first mode to a second mode, wherein said rack member, moveably coupled to a base of a cargo platform having a base, and a back coupled to said base, a motive structure coupled to said base for moveably supporting said cargo platform above a surface, and a handle coupled to said back; said rack member includes one or more rack motive elements, said rack member including said first mode for engaging said surface with said one or more rack motive elements and a second mode with said one or more rack motive elements disengaged from said surface, said rack member presenting a platform adjacent said cargo platform when in said first mode.

37. An apparatus, comprising:
a cargo platform having a base, and a back coupled to said base;
a motive structure coupled to said base for moveably supporting said cargo platform above a surface;
a handle coupled to said back; and
a rack member, moveably and extendably coupled to said base, including one or more rack motive elements, said rack member including a first mode for engaging said surface with said one or more rack motive elements and a second mode with said one or more rack motive elements disengaged from said surface, said rack member presenting a platform adjacent said cargo platform when in said first mode;
including a latching mechanism coupled to said rack member for maintaining said first angle substantially fixed;
wherein said rack member is rotatably coupled to said base with said rack member rotating between said first mode and said second mode;
wherein said first mode extends said rack member in a first angle of about ninety degrees or greater from said back;
wherein said first mode is a push mode and said second mode is a non-cargo mode; and
wherein said cargo member includes a third mode for engaging said surface with said one or more rack motive elements with said rack member in a second angle.

38. The apparatus of claim 37 wherein said cargo member includes a third mode for engaging said surface with said one or more rack motive elements with said rack member in a second angle.

39. The apparatus of claim 38 wherein said latching mechanism is disengaged from said rack member permitting said second angle to vary during movement.

40. The apparatus of claim 39 wherein said third mode is a pull mode.

41. An apparatus, comprising:
a cargo platform having a base, and a back coupled to said base;
a motive structure coupled to said base for moveably supporting said cargo platform above a surface;
a handle coupled to said back; and
a rack member, moveably and extendably coupled to said base, including one or more rack motive elements, said rack member including a first mode for engaging said surface with said one or more rack motive elements and a second mode with said one or more rack motive elements disengaged from said surface, said rack member presenting a platform adjacent said cargo platform when in said first mode;

wherein said rack member is rotatably coupled to said base with said rack member rotating between said first mode and said second mode;

wherein said one or more rack motive elements include a first position relative to said rack member when said rack member is in said first mode and a second position relative to said rack member when said rack member is in said second mode, said second position adapted for storage of said one or more rack motive elements; and wherein said one or more rack motive elements move between said first position and said second position responsive to rotation of said rack member between said modes.

42. An apparatus, comprising:

a cargo platform having a base providing a cargo carrying capacity, and a back coupled to said base;

a motive structure coupled to said base for moveably supporting said cargo platform above a surface;

a handle coupled to said back; and a rack member, moveably and extendably coupled to said base, including one or more rack motive elements, said rack member including a first mode for engaging said surface with said one or more rack motive elements and a second mode with said one or more rack motive elements disengaged from said surface, said rack member presenting a platform adjacent said cargo platform when in said first mode;

wherein said rack member extends said cargo carrying capacity when in said first mode.

* * * * *